(12) United States Patent
Pontanari et al.

(10) Patent No.: US 9,371,890 B2
(45) Date of Patent: Jun. 21, 2016

(54) TRANSMISSION GROUP FOR VEHICLES AND VEHICLE PROVIDED WITH SUCH TRANSMISSION GROUP

(75) Inventors: Marco Pontanari, Riva del Garda (IT); Pietro Casarola, Laterza (IT)

(73) Assignee: Dana Italia S.P.A., Arco (Trento) (IT)

( * ) Notice: Subject to any disclaimer, the term of this patent is extended or adjusted under 35 U.S.C. 154(b) by 0 days.

(21) Appl. No.: 13/261,648

(22) PCT Filed: Nov. 23, 2011

(86) PCT No.: PCT/EP2011/005968
§ 371 (c)(1),
(2), (4) Date: Aug. 23, 2013

(87) PCT Pub. No.: WO2012/069210
PCT Pub. Date: May 31, 2012

(65) Prior Publication Data
US 2013/0319175 A1  Dec. 5, 2013

(30) Foreign Application Priority Data

Nov. 23, 2010 (IT) .............................. MI2010A2168

(51) Int. Cl.
*F16H 47/00* (2006.01)
*F16H 3/08* (2006.01)
*F16H 57/00* (2012.01)
(Continued)

(52) U.S. Cl.
CPC ................. *F16H 3/08* (2013.01); *F16H 57/00* (2013.01); *F16H 47/02* (2013.01); *F16H 2057/005* (2013.01); *F16H 2057/02056* (2013.01); *Y10T 74/19149* (2015.01); *Y10T 74/19219* (2015.01)

(58) Field of Classification Search
CPC .................... F16H 31/001; F16H 3/08; F16H 2057/02056; F16H 47/02; F16H 2057/005; F16H 57/00; H02K 7/07
USPC ............................................... 74/665 L, 730.1
See application file for complete search history.

(56) References Cited

U.S. PATENT DOCUMENTS

| | | | |
|---|---|---|---|
| 1,331,139 A * | 2/1920 | Barnes | 74/343 |
| 1,813,614 A * | 7/1931 | Franks | 74/129 |
| 6,017,046 A * | 1/2000 | Markovic | 280/250.1 |

(Continued)

FOREIGN PATENT DOCUMENTS

| | | |
|---|---|---|
| DE | 4034689 A1 | 5/1992 |
| DE | 4307616 A1 | 9/1994 |

(Continued)

*Primary Examiner* — William Kelleher
*Assistant Examiner* — Zakaria Elahmadi
(74) *Attorney, Agent, or Firm* — Marshall & Melhorn, LLC

(57) ABSTRACT

Transmission group for vehicles comprising an engine provided with at least one engaging device, arranged between transmission gears and mobile between a first rest position, wherein the transmission gears are mutually integral and both in mesh with a transmission shaft, and a second working position wherein the first gear is in mesh with the transmission shaft and the second gear is unconstrained both with respect to the transmission shaft and with respect to the gear, provided for being means for actuating of the engage device, wherein the engine, the output gear and an output shaft are integrated in a first module fixed to the vehicle and that the transmission shaft, the transmission gears, the engage device and the actuating means thereof are integrated in a second module independent and demountable with respect to the first module.

8 Claims, 7 Drawing Sheets

(51) Int. Cl.
*F16H 47/02* (2006.01)
*F16H 57/02* (2012.01)

(56) References Cited

U.S. PATENT DOCUMENTS

| | | | | |
|---|---|---|---|---|
| 6,931,954 | B2* | 8/2005 | Jinbo | 74/64 |
| 7,992,484 | B2* | 8/2011 | Kadlicko | 92/12.2 |
| 8,216,103 | B1* | 7/2012 | Boczula | 475/14 |
| 8,231,103 | B2* | 7/2012 | Min | 251/129.11 |
| 8,429,992 | B2* | 4/2013 | Braford | 74/331 |
| 2002/0029655 | A1* | 3/2002 | Obinata et al. | 74/730.1 |
| 2003/0213336 | A1* | 11/2003 | Hori et al. | 74/730.1 |
| 2004/0112171 | A1* | 6/2004 | Kuhstrebe et al. | 74/730.1 |
| 2004/0118243 | A1* | 6/2004 | Mallard | 74/730.1 |
| 2005/0241437 | A1* | 11/2005 | Gray et al. | 74/730.1 |
| 2010/0300223 | A1* | 12/2010 | Farb | 74/35 |
| 2012/0270690 | A1* | 10/2012 | Haglsperger et al. | 475/5 |

FOREIGN PATENT DOCUMENTS

| | | | |
|---|---|---|---|
| DE | 60101814 T2 | 11/2004 | |
| DE | 10 2007 057 534 A1 | 6/2009 | |
| DE | 102007057534 A1 | 6/2009 | |
| EP | WO2009067998 | * 6/2009 | F16H 47/04 |

* cited by examiner

Fig. 7  PRIOR ART
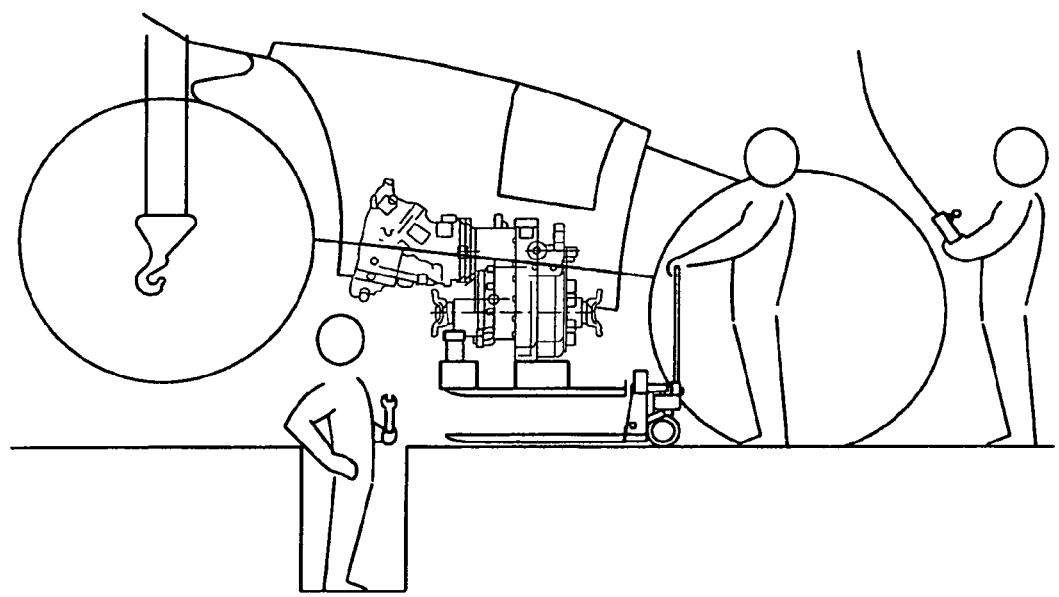
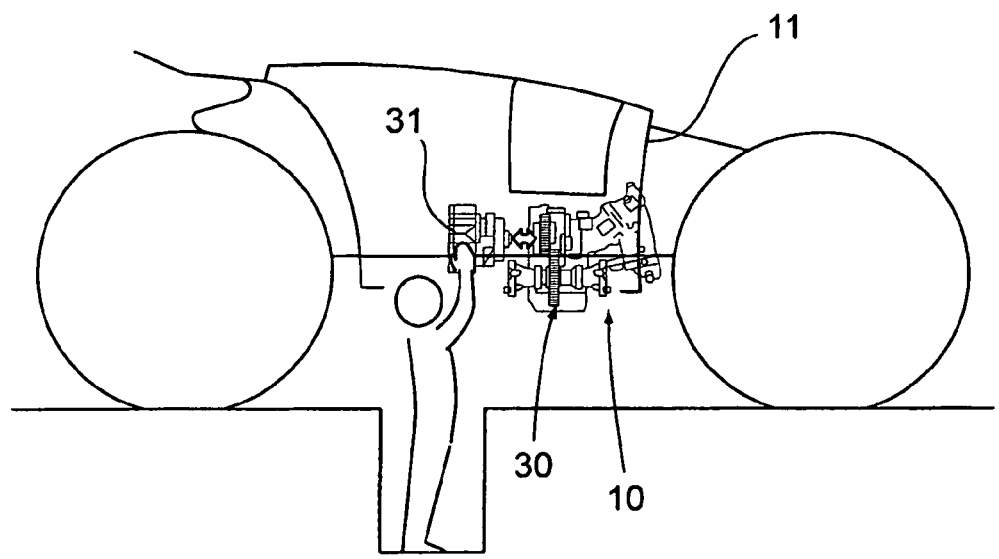
Fig. 8

TRANSMISSION GROUP FOR VEHICLES AND VEHICLE PROVIDED WITH SUCH TRANSMISSION GROUP

BACKGROUND OF THE INVENTION

The present invention refers to an improved transmission group for vehicles and to a vehicle provided with such transmission group.

Transmissions for vehicles of the type comprising an engine for generating motion and an output shaft for sending motion to a unit, for example to the wheels, are currently known.

Usually, the known transmission groups further comprise a transmission shaft in mesh with the engine, transmission gears associated to the transmission shaft and an output gear associated to the output shaft and in mesh with at least one of the transmission gears.

In the case of transmission gears with several gears or in presence of several engines in vehicles with direct drive torque, the transmission gear is further respectively provided with a synchroniser and/or a clutch arranged between the transmission gears and relative actuating means.

Usually, all the aforementioned elements are assembled in a single module or casing which, in case of maintenance, as shown in FIG. 7, should be demounted from the relative vehicle.

This practice reveals a considerable drawback lying in the fact that, even in case of failure of a single component, there still arises the need of removing the entire transmission.

Actually, the transmissions known and sold today provide for the assembly of components of varying complexity, criticality and with different request of maintenance within a single containment element provided by two half-boxes or in a pan and relative covers.

The assembly occurs by consecutively positioning the single components or the small sub-assemblies, within the main box.

Inside the transmission components are thus arranged with high level of criticality mixed with elements with low level of criticality, according to a logic that does not provide for an easy maintenance and an equally easy verification of the state of the components, but it facilitates the consecutive assembly of the single objects following a strictly production logic.

The maintenance thus unfortunately requires the removal of the entire transmission from the vehicle and/or a large amount of components both outside and within the transmission, though the latter are not directly involved in the maintenance operation.

The operation of removing the transmission from the vehicle is potentially very hazardous for the operator.

Actually, intervening on the transmission fastening screws positioned beneath the vehicle obligatorily requires operating in an uncomfortable position and with narrow spaces for intervention.

Furthermore, removing the entire transmission requires suitable support equipment that is difficult to transport.

BRIEF SUMMARY OF THE INVENTION

An object of the present invention is that of providing an improved transmission group for vehicles capable of overcoming the previously mentioned drawbacks of the prior art in an extremely simple, economical and particularly functional manner.

Another object is to provide an improved transmission group for vehicles consisting in two independent modules having a different level of complexity, maintenance and criticality.

Another object is to provide an improved transmission group for vehicles in which the module with high technology content can be easily demounted with respect to the module with low technological content, directly mounted on the chassis or axle of the vehicle.

These objects according to the present invention are attained by providing an improved transmission group for vehicles as outlined in claim 1.

Further characteristics of the invention are outlined by the dependent claims.

BRIEF DESCRIPTION OF THE DRAWINGS

Characteristics and advantages of an improved transmission group for vehicles according to the present invention will be more apparent from the following exemplifying and non-limiting description with reference to the attached schematic drawings, wherein:

FIG. 7 shows a vehicle in the maintenance step with a known transmission group mounted; and FIG. 8 shows a vehicle in maintenance step with a transmission group mounted according to the present invention.

DETAILED DESCRIPTION OF THE INVENTION

With reference to the figures, an embodiment of an improved transmission group for vehicles according to the present invention is shown with 10.

Figure 1:
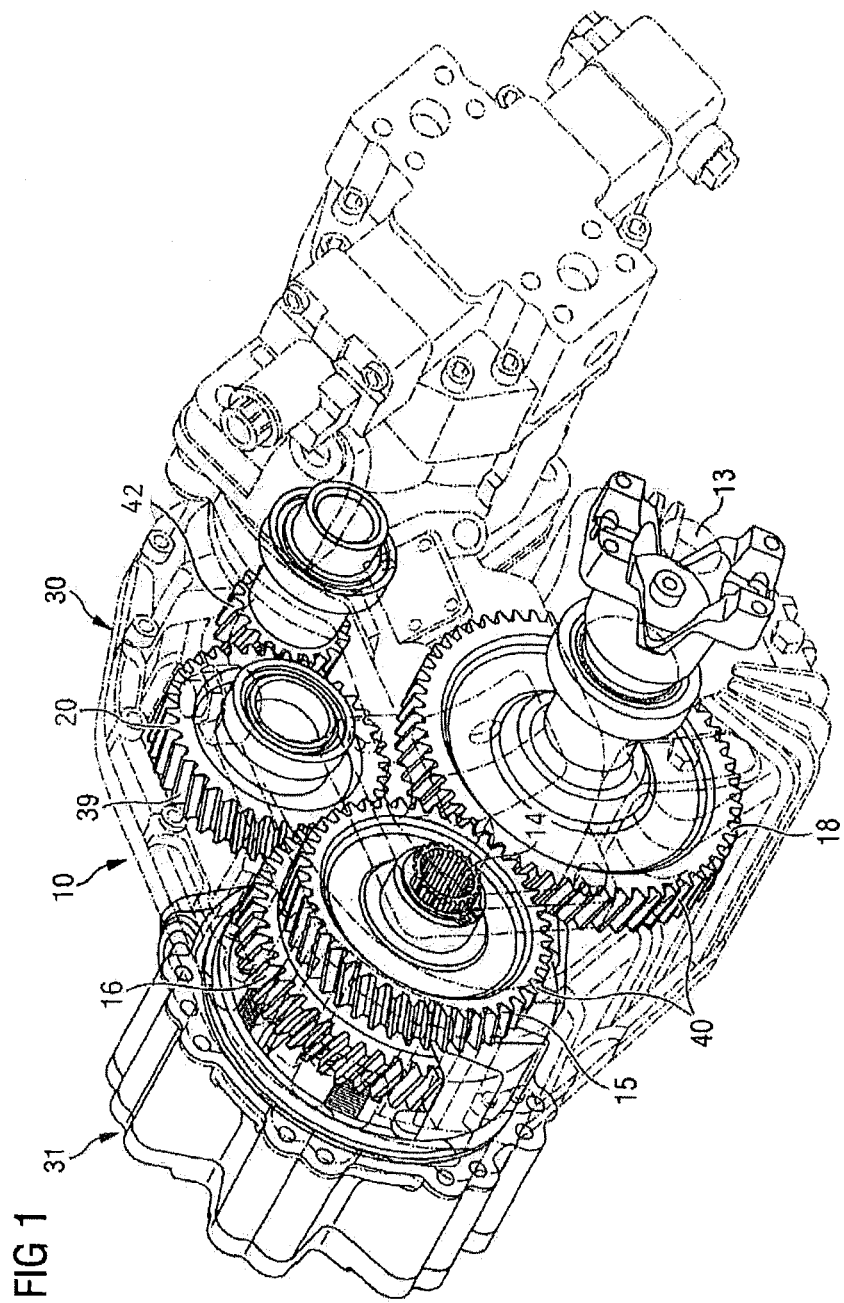
FIG. 1 is a partial and cross-sectional view of an improved transmission group for vehicles according to the present invention.
Figure 3:
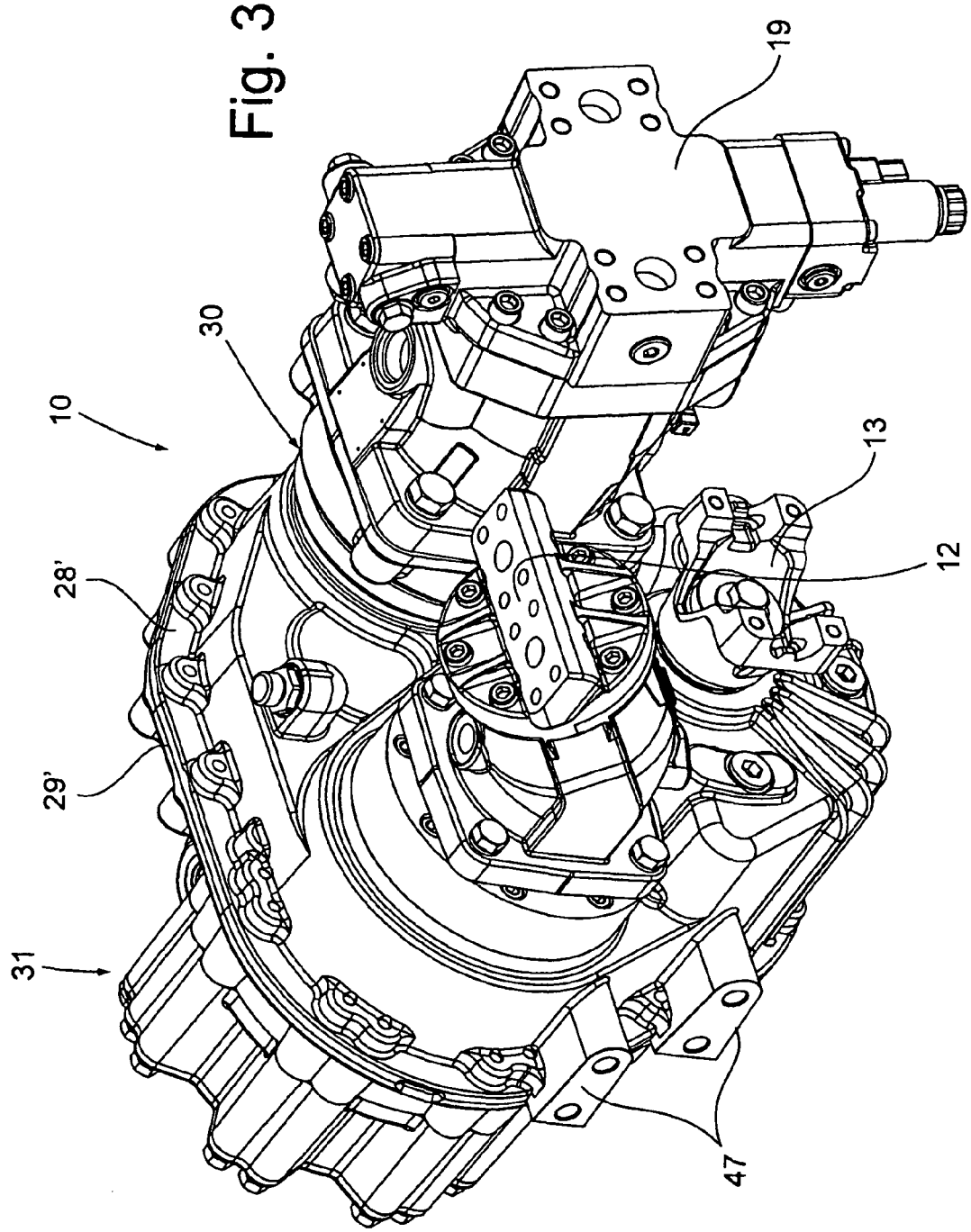
FIG. 3 is a perspective view of the transmission group of FIG. 1 assembled.

Such transmission group 10 for vehicles 11, shown in a cutaway view in FIG. 1 and assembled in FIG. 3, comprises an engine 12 for generating motion and an output shaft 13 for sending the motion to a unit, for example the wheels.

Furthermore, such transmission group 10 comprises a transmission shaft 14 in mesh with the engine 12, at least one first and one second transmission gear 15, 16 associated to the transmission shaft 14, and an output gear 18 associated to the output shaft 13 and in mesh with at least one of the transmission gears 15.

An engage device 17, such as for example a clutch 17 in the case of direct drive torque engines as shown in the figures or a synchroniser in the case of gear engines, arranged between the transmission gears 15, 16 and relative actuating means are also provided for.

In the cases where such engage device is a clutch 17, as actually shown in the drawings, it is of the type movable between a first rest position, in which the transmission gears 15, 16 are mutually integral and are both in mesh with the transmission shaft 14, and a second working position in which the first gear 15 is in mesh with the transmission shaft 14 and the second gear 16 is unconstrained both with respect to the transmission shaft 14 and with respect to the first gear 15.

In particular, according to the invention the engine 12, the output gear 18 and the output shaft 13 are integrated in a first module 30 fixed to the vehicle 11 while the transmission shaft 14, the transmission gears 15, 16, the clutch 17 and the relative actuating means are integrated in a second module 31 independent and demountable with respect to the first module 30.

Figure 2:
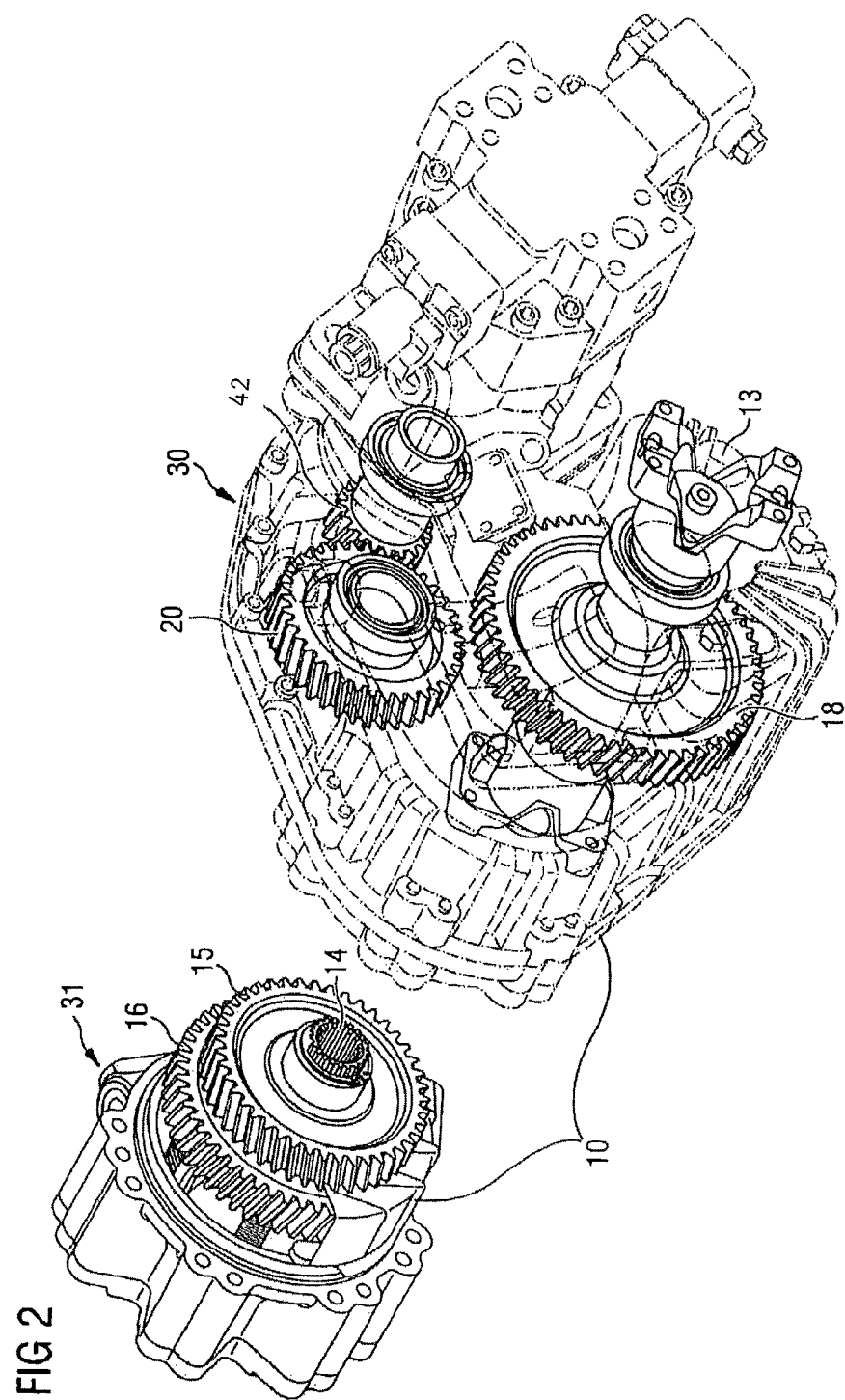
FIG. 2 is an exploded view of the transmission group of FIG. 1.

FIG. 2 shows the second module demounted with respect to the first, which remains fixed to the chassis.

Thus, all the elements of the transmission with high criticality which requires maintenance more frequently can be removed easily as shown in FIG. 8.

In the example shown in the figures a further drive engine 19 of a secondary gear 20 is provided in mesh with the second transmission gear 16 free with respect to the output gear 18.

Figure 6:
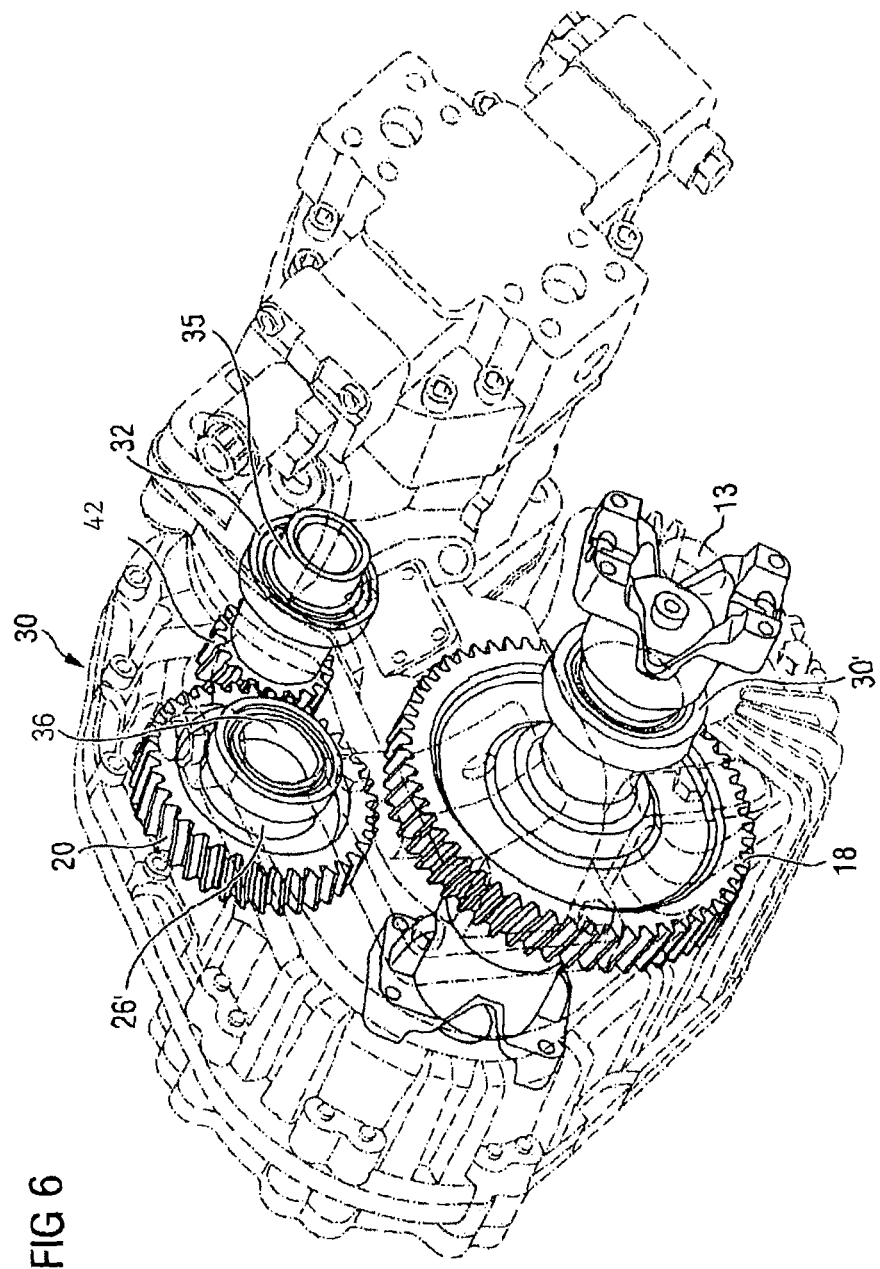
FIG. 6 is a partial cutaway view of another module of the transmission group of FIG. 1.

As observable in FIG. 6, such further engine 19 and the secondary gear 20 are integrated in the first module 30 fixed to the vehicle 11.

Possibly, it is also possible to provide an intermediate gear 42 arranged between the secondary gear 20 and the further engine 19.

Regarding the clutch 17, which can be controlled by a piston 18', of the hydraulic, mechanical, pneumatic or electrical type, it may comprise a first plurality of discs 21 connected to the second transmission gear 16 in mesh with the secondary gear 20, a second plurality of discs 22 connected to the transmission shaft 14 interposed between the first plurality of discs 21, a push-disc-element 23 and a reaction disc 24.

As shown in the figures, the gears can be gear wheels or alternatively other equivalent components, while the engines are for example hydraulic engines.

With reference to the example shown in the figures, the operation of the improved transmission group according to the present invention is very simple.

The invention is based on the principle of providing a transmission, in particular for heavy vehicles, comprising two modules with different level of criticality, indicated in the figures and distinguished by the indices 30 and 31.

The hydrostatic transmission, provided with two hydraulic engines 12 and 19, is made up of two sub-groups, 30 and 31, in which the second 31 is the sub-group with high degree of technology and criticality, and the first 30 is the sub-group base with low level of technology and criticality directly connected to the vehicle through the supports 47. Examining the transmission group of FIG. 1, it can be observed that the kinematic chain is made up of two power branches or gear drives, 39 and 40.

The first gear drive 40, is always in mesh with and connects the shaft 14 and the gear 15 to the gear 18 integral with the output shaft 13.

The second gear drive 39 is made up of three gear wheels 42, 20, 16.

Figure 4:
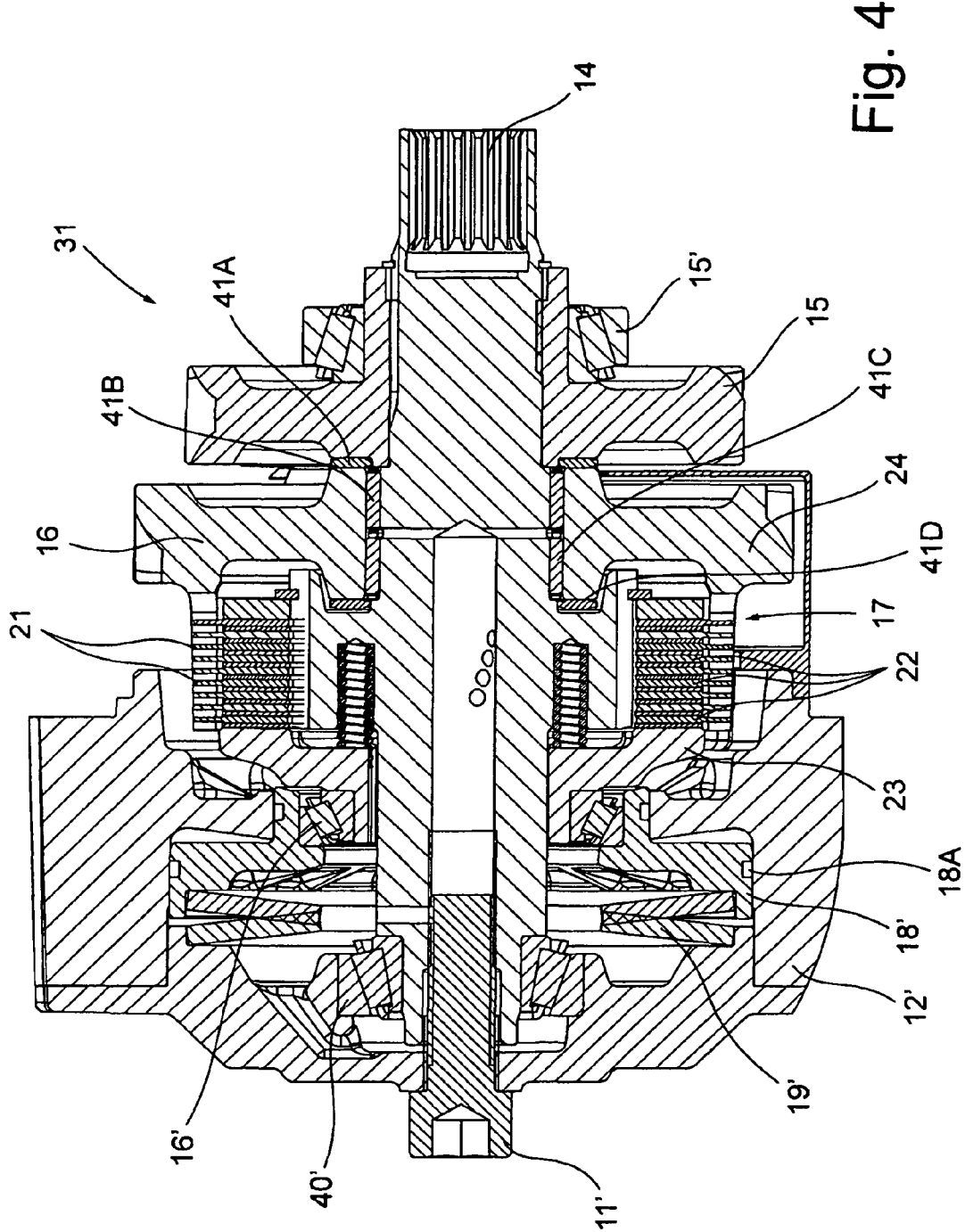
FIG. 4 is a sectional view of a demountable module of the transmission group of FIG. 1.
Figure 5:
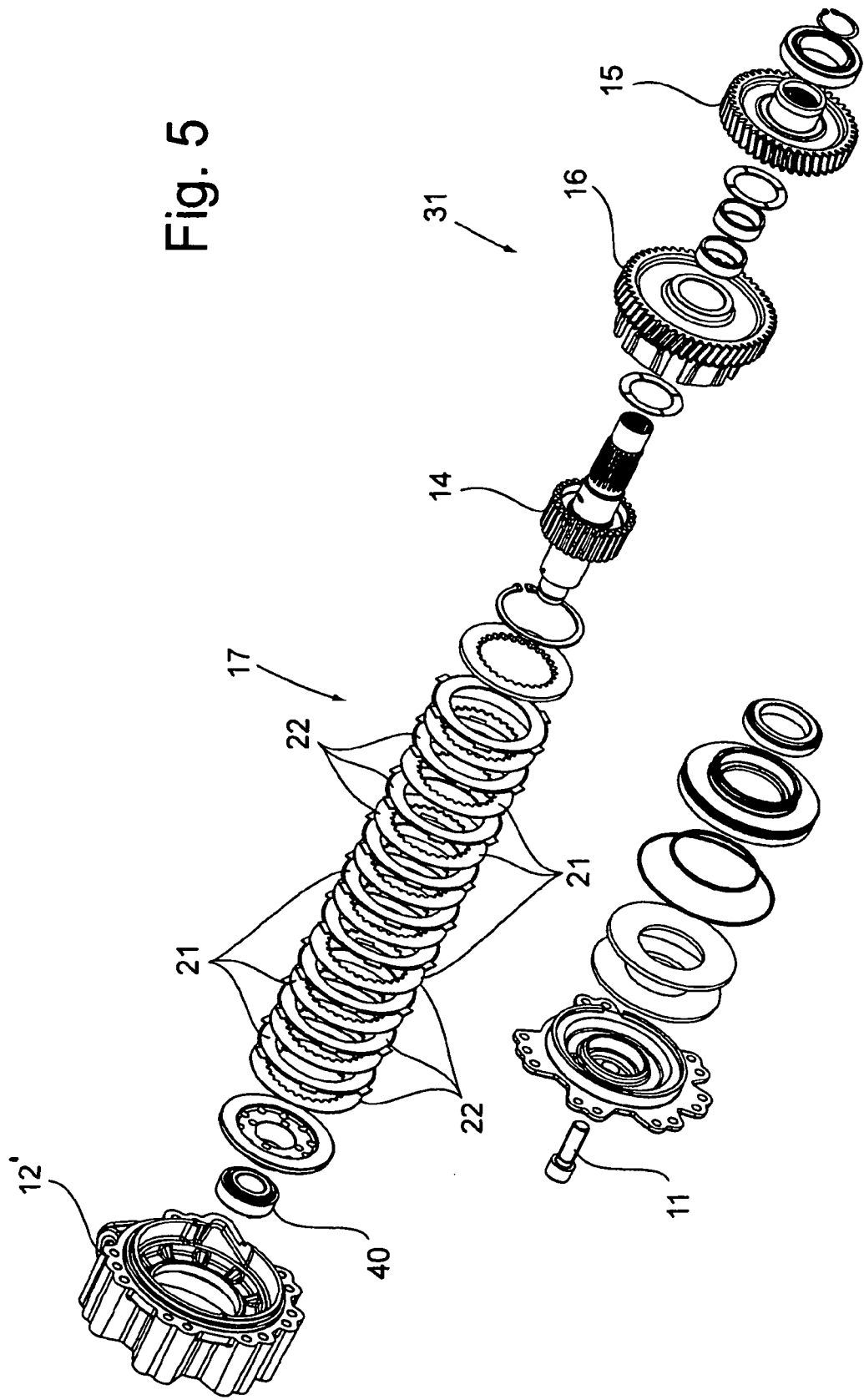
FIG. 5 is an exploded view of the module of FIG. 4.

The gear wheel 16, as shown in FIGS. 4 and 5, comprises a hood which engages the clutch discs 21.

The latter 21, alternatively mounted with the intermediate discs 22 integral with the shaft 14, can be compressed between the push-disc element 23 and the reaction disc 24 for allowing the transfer of mechanical power from the engine 19 to the output shaft 13, rapidly connecting the gear drive 39 and 40.

In the case in which high speed is required to the detriment of the torque, the clutch 17 can be disengaged by intervening on the hydraulic piston 18'. Actually, the push-disc element 23 is discharged by the force generated by the springs 19' which, through the piston 18' and the bearing 16', allow compressing the clutch pack 17 and thus makes the gears 15 and 16 integral. By filling the chamber 18A with pressurised hydraulic oil, the piston 18' is displaced towards the springs 19', overcoming the force of the latter and allowing the clutch discs 21 and the intermediate discs 22 to create a clearance which avoids contacts and transfer of possible torques.

With reference to FIG. 4, it is observed that the sub-group with low level of technology and criticality 30 is actually made up of a box 28' which integrates the supports for the connection of the entire transmission to the chassis of the vehicle 11, a cover 29' which closes the sub-group 30, made up of three gear wheels 42, 20, 18 among which only two mutually mesh 20, 42, three shafts 13, 35, 36 and an equivalent number of pairs of bearings 30', 26', 32. All these components have a low level of criticality with respect to the other components of the transmission, they are well known in the mechanical construction industry and easy to dimension.

The sub-group with high technological and criticality content 31 is made up of a box 12' which supports the group and which serves as a connection member between the two sub-groups with different level of technology and criticality 30 and 31. Within the box 12' there is a shaft 14 supported by the bearings 15', 16', 40', on which the gear wheel 15 and—through bearings 41 A,B,C,D—the gear wheel 16 are rigidly mounted. On the shaft the clutch 17 and all the actuation members 19', 18' are also accommodated. An elastic ring blocks the gear wheels 15, 16 and the respective supports 41 A, B, C, D, and the entire sub-group 30 is assembled/disassembled by means of a screw 11'.

It has thus been observed that an improved transmission group for vehicles and a vehicle provided with such transmission group according to the present invention attain the objects outlined above.

Actually, the present invention improves the state of the art from the maintenance point of view due to the division of the transmission into sub-groups of different level of criticality. The sub-group may be removed outside the assembly and inspected or tested separately with greater simplicity and better visibility on the single components.

In a step prior to the assembly, a sub-group with greater criticality can be tested separate from the transmission.

Furthermore, the safety of the operator carrying out the maintenance is increased given that the invention allows the operator, positioned under the vehicle, to remove a sub-group that is small in size and light. The current solutions instead provide for the removal from the vehicle of the entire transmission having considerable weight and overall dimensions.

The vehicle downtime block times are reduced given that the sub-group 31 can be replaced by another identical model by simply unfastening the screws of the sub-assembly, removal/replacement of the critical sub-group and re-fastening fastening screws of the sub-group.

The improved transmission group for vehicles and a vehicle provided with such transmission group of the present invention thus conceived can be subjected to numerous modifications and variants, all falling within the same inventive concept; furthermore, all the details can be replaced by technically equivalent elements. In practice, the materials used, as well as the dimensions thereof, may vary depending on the technical requirements.

The invention claimed is:
1. A transmission group for vehicles comprising:
i. an engine for generating motion,
ii. an output shaft for sending said motion to a unit,
iii. a transmission shaft engaged with said engine, iv. at least a first and a second transmission gear associated with said transmission shaft,
v. an output gear associated with said output shaft and in mesh with at least one of said transmission gears,
vi. an engaging device placed between said transmission gears,
vii. actuating means of said engaging device,
viii. a further drive engine engaged with a secondary gear, said secondary gear in mesh with a transmission gear and said secondary gear not engaged with said output gear;

wherein said engaging device is mobile between
a. a first rest position, wherein said transmission gears are mutually integral and both in mesh with said transmission shaft, and
b. a second working position wherein said first gear is in mesh with said transmission shaft and said second gear is released both with respect to said transmission shaft, and with respect to said first gear;

wherein said engine, said further drive engine, said secondary gear, said output gear and said output shaft are integrated in a first module fixed to said vehicle;

wherein said transmission shaft, said transmission gears, said engaging device and said actuating means of said engaging device are integrated in a second module, the second module further comprising a casing, wherein the casing supports the transmission shaft, the transmission gears, the engaging device and the actuating means and wherein the casing is configured to connect the second module to the first module; and wherein the second module is configured to be mounted on the first module by mounting the casing on the first module and wherein the second module is configured to be dismounted from the first module by dismounting the casing from the first module.

2. The transmission group according to claim 1, wherein said engage device comprises a clutch for the selective engaging of said further engine.

3. The transmission group according to claim 2, further comprising an intermediary gear placed between said secondary gear and said further engine.

4. The transmission group according to claim 3, wherein said clutch comprises a first plurality of discs connected with said transmission gear in mesh with a secondary gear, a second plurality of discs connected with said transmission shaft placed among said first plurality of discs, a push-disc element and the reaction disc.

5. The transmission group according to claim 4, wherein said actuating means of said clutch comprise a piston.

6. The transmission group according to claim 5, wherein said output gear, said transmission gears, said first gear, said second gear, said secondary gear, and said intermediary gear are gear wheels.

7. The transmission group according to claim 1, wherein said engage device comprises a synchronizer.

8. The transmission group according to claim 1, wherein said engine and said drive engine are hydraulic engines.

* * * * *